(12) United States Patent
Rosenstein et al.

(10) Patent No.: US 8,868,637 B2
(45) Date of Patent: *Oct. 21, 2014

(54) PAGE RENDERING FOR DYNAMIC WEB PAGES

(75) Inventors: Justin Rosenstein, San Francisco, CA (US); Changhao Jiang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/553,064

(22) Filed: Sep. 2, 2009
(Under 37 CFR 1.47)

(65) Prior Publication Data
US 2011/0055314 A1    Mar. 3, 2011

(51) Int. Cl.
| G06F 15/16 | (2006.01) |
| H04L 29/08 | (2006.01) |
| G06F 17/30 | (2006.01) |

(52) U.S. Cl.
CPC .......... *G06F 17/30899* (2013.01); *H04L 67/02* (2013.01); *H04L 67/2828* (2013.01); *H04L 67/289* (2013.01); *H04L 67/34* (2013.01); *H04L 67/2819* (2013.01)
USPC .......... 709/202; 709/203; 709/217; 709/223; 709/225; 709/235

(58) Field of Classification Search
USPC ......... 709/203, 202, 217, 219, 223, 225, 230, 709/232, 235
See application file for complete search history.

(56) References Cited

U.S. PATENT DOCUMENTS

| | | | |
|---|---|---|---|
| 6,192,398 B1 * | 2/2001 | Hunt | 709/213 |
| 6,598,048 B2 * | 7/2003 | Carneal et al. | 1/1 |
| 7,058,944 B1 * | 6/2006 | Sponheim et al. | 718/100 |
| 7,177,918 B2 * | 2/2007 | Joshi et al. | 709/219 |
| 7,487,201 B1 * | 2/2009 | Murray et al. | 709/201 |
| 7,941,420 B2 * | 5/2011 | Chitrapura et al. | 707/709 |
| 8,005,946 B2 * | 8/2011 | Le Roy et al. | 709/224 |
| 8,046,681 B2 * | 10/2011 | Vydiswaran et al. | 715/234 |
| 8,195,767 B2 * | 6/2012 | Albrecht et al. | 709/219 |
| 8,412,802 B2 * | 4/2013 | Greiner et al. | 709/219 |
| 2004/0122971 A1 * | 6/2004 | Joshi et al. | 709/236 |
| 2004/0205165 A1 * | 10/2004 | Melamed et al. | 709/219 |
| 2005/0144186 A1 * | 6/2005 | Hesselink et al. | 707/101 |
| 2007/0101258 A1 * | 5/2007 | Xu et al. | 715/516 |
| 2007/0124415 A1 * | 5/2007 | Lev-Ran et al. | 709/217 |
| 2008/0313206 A1 * | 12/2008 | Kordun et al. | 707/102 |
| 2009/0070392 A1 * | 3/2009 | Le Roy et al. | 707/203 |
| 2009/0077112 A1 * | 3/2009 | Albrecht et al. | 707/102 |
| 2009/0083293 A1 * | 3/2009 | Albrecht et al. | 707/100 |
| 2010/0161717 A1 * | 6/2010 | Albrecht et al. | 709/203 |
| 2010/0223322 A1 * | 9/2010 | Mott et al. | 709/203 |
| 2011/0055683 A1 * | 3/2011 | Jiang | 715/234 |

* cited by examiner

*Primary Examiner* — Jimmy H Tran
(74) *Attorney, Agent, or Firm* — Baker Botts L.L.P.

(57) ABSTRACT

In one embodiment, in response to the detection of an event initiated in connection with a first structured document rendered by a first client application executing on a host, the event related to a target structured document, a method includes receiving, by executable code segment embedded in with the first structured document and executing within the context of the first client application, a first request for resources, related to the target structured document, generated by the first client application; formulating and transmitting, by the executable code segment, a second request related to the target structured document to a remote server; accessing, by the executable code segment, one or more resources related to the target structured document; and rendering, by the executable code segment, content rendered by the first client application based at least in part on the one or more accessed resources.

26 Claims, 5 Drawing Sheets

PAGE RENDERING FOR DYNAMIC WEB PAGES

TECHNICAL FIELD

The present disclosure relates generally to rendering structured documents (such as web pages) and, more particularly, to efficiently rendering structured documents using asynchronous techniques.

BACKGROUND

Conventionally, when a user viewing web content at a remote client desires to navigate to a new web page from the currently rendered web page (e.g., by clicking on a link within the currently rendered web page, by clicking the back or forward button of a browser application, or by entering the URL of the target web page), the browser responsible for rendering the web content formulates a request for the new web page and transmits the request to a server hosting the new (or "target") web page. Thus, conventionally, each time a user requests to navigate to a new web page, the browser transmits a request to the server for the full new web page, unloads the currently rendered page, and renders the new web page received from the server in its entirety. Conventionally, this full page loading and unloading scheme would hold true for each subsequent page the user requests. Certain resources embedded in the underlying web page may be located in a browser cache and retrieved locally. Hence, even if the new web page and the currently rendered web page include or share a substantial amount of the same content or other resources, the browser would still send a request for the entire target web page including the redundant content or other resources previously transmitted for the currently rendered web page and fully render the page, including accessing and initializing one or more code modules (such as JavaScript) executing within the context of the page.

BRIEF SUMMARY OF PARTICULAR EMBODIMENTS

Particular embodiments provide techniques for rendering structured documents (e.g., web pages) by eliminating redundant requests for resources that are already present client-side (e.g., stored in a cache) before sending the requests for the structured documents to a web server. In particular embodiments, a client application (e.g., a browser) may render a first structured document, and then detect initiation of an event (e.g., a click on a hyperlink or clicking on the "Back" button in the browser) in connection with the first structured document—this event may be related to a target structured document. An executable code segment (e.g., a script) may be embedded within the first structured document and executing within the context of the client application. The executable code segment may receive a first request for resources that was generated by the client application in relation to the target structured document. In particular embodiments, the executable code segment may re-formulate the first request into a second request related to the target structured document, and then send the second request to a web server. The second request may be formulated to reduce transmission of redundant data—one technique for accomplishing this is by requesting only those resources not currently stored on the host. The executable code segment then retrieves new resources related to the target structured document and may recycle content previously rendered by the first client application for the first structured document.

DESCRIPTION OF EXAMPLE EMBODIMENTS

Particular embodiments relate to efficiently rendering web pages using asynchronous techniques. More specifically, particular embodiments relate to systems, methods, and logic for rendering a target web page that reduces or eliminates the browser overhead associated with reloading content (whether accessed remotely from a server and/or locally from a cache) and re-executing scripts that were downloaded in connection with one or more previously rendered web pages. Particular embodiments utilize Asynchronous JavaScript and XML (AJAX) techniques to request only the new content and resources that are necessary to render the target web page without causing a browser or underlying client application to unnecessarily naively re-render the entire web page. Particular embodiments further simulate a page transition typically experienced when transitioning from one page to the next. Particular embodiments relate to a downloadable process that executes within the context of a browser and that intercepts requests from the browser for a target web page, formulates and transmits its own request(s), accesses one or more resources corresponding to the target web page, and re-renders or resets content rendered for a previous page by a browser based on or with the one or more resources corresponding to the target web page. Particular embodiments reduce or eliminate the transmitting of redundant data shared between a currently rendered web page and a target web page, thereby improving efficiency and network performance. Particular embodiments reduce or eliminate the processing overhead associated with re-initializing code modules, such as JavaScript, that execute within the context of the target web page. Particular embodiments further relate to a process as just described that is transparent to users (e.g., viewers) of the rendered web pages as well as to developers developing applications for web pages enabling the developers to generate (e.g., code) applications in traditional manners. In various example embodiments, one or more described web pages may be associated with a social networking system or social networking service executing within a web-site. However, embodiments of the invention have application to the retrieval and rendering of structured documents hosted by any type of network addressable resource or web-site. As used herein, a "user" may be an individual, a group, or an entity (such as a business or third party application).

Figure 1:
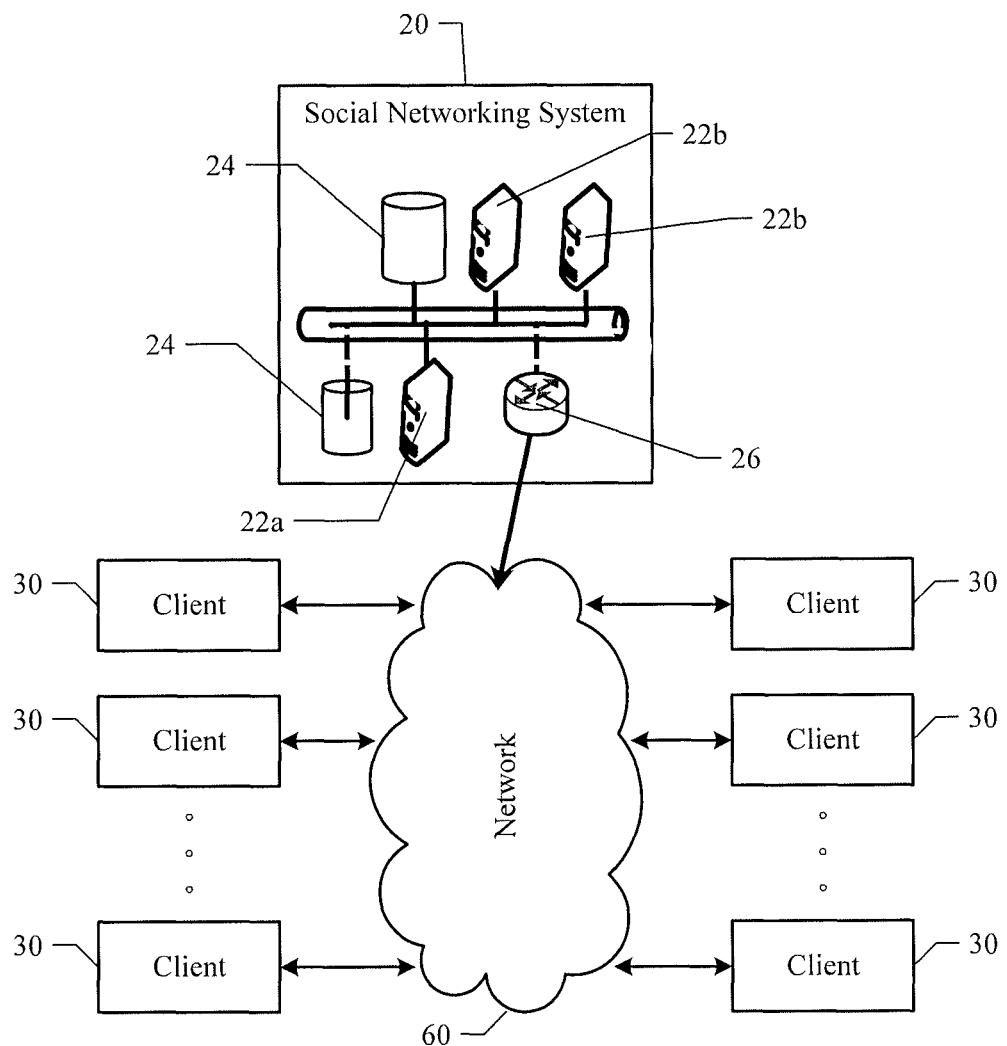
FIG. 1 illustrates an example network environment.

Particular embodiments of the invention may operate in a wide area network environment, such as the Internet, including multiple network addressable systems. FIG. 1 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising social networking system 20 and one or more client devices 30. Client devices 30 are operably connected to the network environment via a network service provider, a wireless carrier, or any other suitable means.

The social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, webpage and applications implemented using Common Gateway Interface script (CGI), PHP Hyper-text Preprocessor (PHP), Active Server Pages (ASP), Hyper Text Markup Language (HTML), Extensible Markup Language (XML), Java, JavaScript, AJAX, and the like.

Physical servers 22 may host functionality directed to the operations of a social networking system. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses (e.g., Hadoop/Hive).

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a tradename and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships between different users. The relationship information may indicate users who have similar or common work experience, group memberships, hobbies, or educational history. A user profile may also include privacy settings governing access to the user's information.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network. In particular implementations, the client applications allow a user of client device 30 to enter addresses of specific network resources to re retrieved, such as resources hosted by social networking system 20. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

Generally, a web application is an application that may be accessed via a web browser over a network, or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications often require access to additional resources associated with other applications.

A resource or page, which may itself include multiple resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

JavaScript is an example of a scripting language that enables various web applications to access resources within other applications for use on the client side of a user session to enable an interactive or dynamic user session when accessing a website. AJAX (shorthand for Asynchronous JavaScript and XML) refers to a group of interrelated techniques used on the client side of a user session to enable more interactive and rich internet applications. Utilizing JavaScript or AJAX, a web application can transmit requests for resources to the backend servers (e.g., servers 22) of the website or other resource providers external to the website in order to retrieve the resources asynchronously in the background operations of the client 30 without interfering with the display and behavior of the currently-rendered page. More particularly, when using AJAX, resources are usually retrieved by transmitting an XMLHttpRequest (XHR) object to the resource provider. An XHR is a document object model (DOM) application programming interface (API) that can be used with a web browser scripting language (e.g., JavaScript) to send, for example, an HTTP or HTTPS request for a resource directly to a web server (e.g., server 22) and load the resource retrieved from the server in response to the request directly back into the scripting language code. Once the resource is within the code, the resource may then be available as, by way of example, an HTML or XML document or plain text. In this manner, the retrieved resource may be used to manipulate the currently active document rendered by the web browser without requiring the client to load a new webpage document. In some example embodiments, if the resource is retrieved as plain text, the plain text may be formatted in JavaScript Object Notation (JSON) by the server and evaluated within JavaScript to create an object of data for use on the current DOM.

Social networking system 20 may include a multitude of features with which users at remote clients 30 may interact during user sessions. In particular embodiments, these features may be implemented as web applications and may utilize JavaScript and Cascading Style Sheet (CSS) resources requested from servers 22 as well as other external servers. By way of example, the social networking system hosted by Facebook®, Inc. of Palo Alto, Calif., includes or supports such features as the "wall," a space on every user's profile page that allows friends to post messages for the user to see; "pokes," which allows users to send a virtual "poke" to each other (a notification that tells a user that they have been poked); "photos," where users can upload albums and photos; "status," which allows users to inform their friends of their whereabouts and actions; "streams," which may appear in multiple locations on the site, including on every user's homepage, which include information about the activities of the user's connections; "notes," a blogging feature that allows tags and embeddable images as well as blogs imported from other blogging websites and services; as well as a large number of third party applications for which the website serves as a platform. In particular, a user's wall is visible to anyone who is able to see that user's profile, depending on privacy settings, and supports the posting of attachments as well as textual content.

In particular embodiments, the social networking system 20 maintains in data store 24 a number of objects for the different kinds of items with which a user may interact while accessing system 20. In one example embodiment, these objects include user profiles, application objects, and message objects (such as for wall posts, emails and other messages). In one embodiment, an object is stored by the system 20 for each instance of its associated item. These objects and the actions discussed herein are provided for illustration purposes only, and it can be appreciated that an unlimited number of variations and features can be provided on a social networking system 20.

Figure 2:
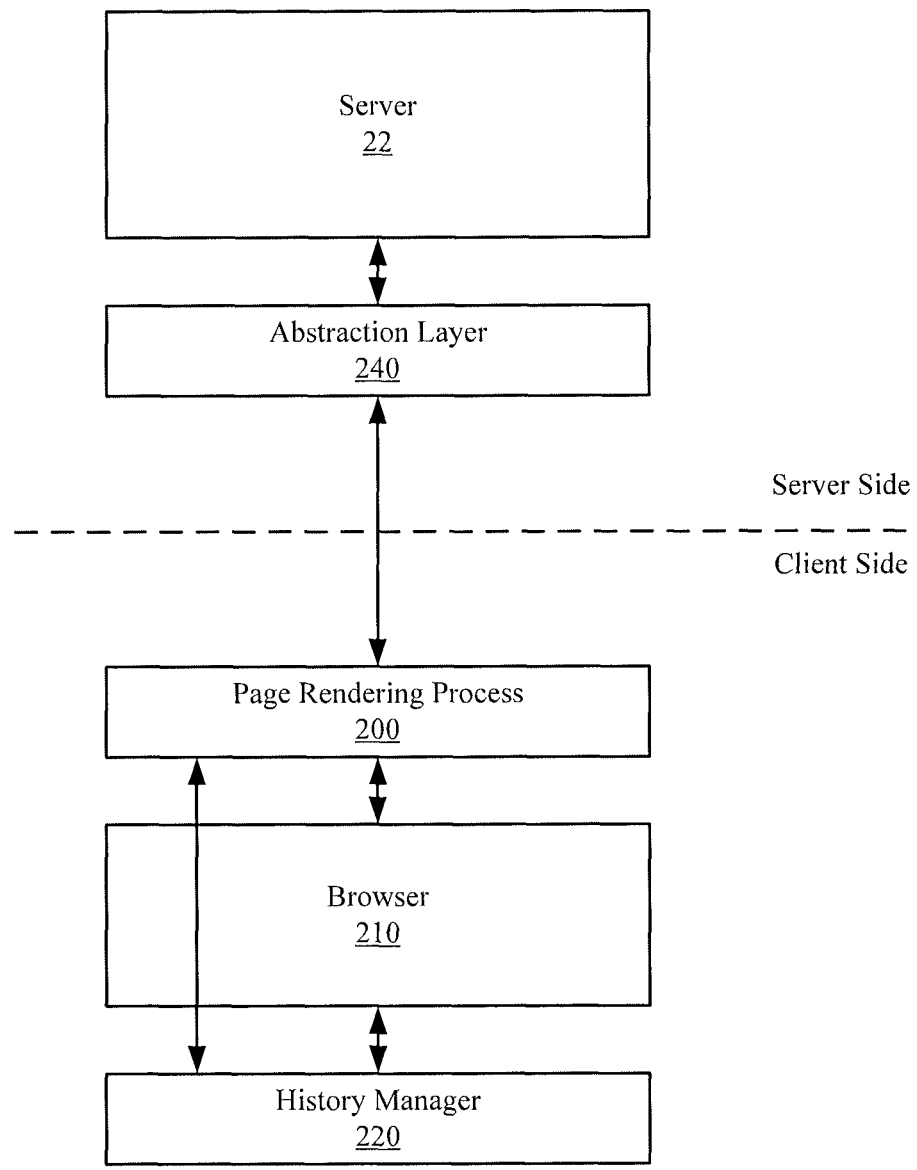
FIG. 2 illustrates an example block diagram showing interaction among various elements of an example network environment.

An example page rendering application or process 200 that facilitates the downloading and rendering of a target web page will now be described with reference to the block diagram of FIG. 2 and the flowcharts of FIGS. 3A and 3B. In particular embodiments, page rendering process 200 may be considered a client application that executes within the context of a web browser 210 executing at a client 30. In one implementation, page rendering process 200 is implemented as one or more executable code segments or script modules (such as JavaScript modules) that are embedded in an underlying web page loaded into web browser 210. By way of example, when a user desires to view a web page of, for example, system 20 hosted by server 22, the user indicates this desire to browser 210 (e.g, by typing in the URL of the web page, by clicking on a bookmark for the web page, or by clicking a textual link or other embedded link to the web page, among other means) executing on the user's host computer (e.g., client 30). Browser 210, executing within client 30, then sends a request to the server 22 hosting the web page. In response to the request, and perhaps after user/client authentication, the server 22 retrieves and transmits to client 30 content, executable scripts, and/or other resources enabling browser 210 to render the web page in a client window displayed via client 30. By way of example, these and other resources retrieved by server 22 may be found at server 22, in data store 24, or in any other suitable server or database accessible by server 22. As described above, the retrieved content may be HTML, XHTML, or XML content, for example, while the scripts may be JavaScript scripts or CSS files, among others, for example. The content and/or other resources may also include plain text and/or JSON, image, audio, and video files, as well as links (e.g., hypertext links) or calls to other resources or pages including URLs of those target resources or pages.

In particular embodiments, server 22 further transmits, with or within the response, executable code or scripts downloadable by browser 210 executing on client 30 for implementing page rendering process 200 within browser 210. By way of example, page rendering process 200 may be embedded as a call within the content or other resources transmitted from server 22. In particular embodiments, the response further includes one or more libraries downloadable by browser 210 for use by page rendering process 200. Generally, each library may include code, data, subroutines or classes for use by page rendering process 200. For example, history manager 220 is an example of a JavaScript module and library that page rendering process 200 may access as described more fully below. In particular embodiments, every time a user, via browser 210 or other application executing on a host client 30, first requests a page or resource from a particular site or server (e.g., server 22) during a new user session with the site or server, the response to the request includes the executable code, scripts, and libraries for implementing page rendering process 200 at the client.

In particular embodiments, after browser 210 downloads the web page, the embedded call for implementing page rendering process 200 automatically calls an initialization function of the process 200 thereby automatically commencing execution of page rendering process 200. In particular embodiments, page rendering process 200 may be considered a software abstraction layer between browser 210 and server 22. The behavior of page rendering process 200 may vary depending on various factors such as the particular browser the page rendering process 200 is executing within. By way of example, referring to FIG. 3A, in the case that browser 210 is a version of Mozilla Firefox, page rendering process 200, and particularly the initialization function, may begin at 302 by attaching on-click event handlers to the links (e.g., hypertext links) within the web page. In particular embodiments, page rendering process 200 then attaches, at 304, other additional historical event handlers to the "back" and "forward" buttons in the client window rendered by browser 210. By way of example and not by way of limitation, a script or code based on the jQuery JavaScript library for dynamically attaching event handlers is provided below:

```
$('a').click(function( ) {
    //'payload' is a JSON encoded response from the server
    $.get(this.href, function(payload) {
        //Dynamically load 'js', 'css' resources for this page.
        bootload(payload.bootload, function( ) {
            //Swap in the new page's content
            $('#content').html(payload.html)
            //Execute the onloadRegister'ed js code
            Execute(payload.onload)
        });
    }
});
```

Generally, each event handler may be considered an asynchronous callback routine that handles a particular event, such as an on-click event (e.g., when a user clicks or otherwise selects a textual image or other link rendered or embedded within the web page) or a historical event (e.g., when a user clicks or otherwise selects the refresh, reload, back or forward button to navigate to a previously rendered web page). Page rendering process 200 may then register the historical event handlers with history manager 220 at 306. History manager 220 is generally a script (e.g., JavaScript) that also executes within browser 210 and records or stores various data relating to visited web pages. More particularly, history manager 220 stores, within a register or data store within client 30, URLs of web pages rendered by browser 210. By way of background, a URL generally specifies a location of a primary resource (e.g., a homepage). A fragment identifier (or hash) may be appended to the primary URL to identify the location of a secondary resource of a target web page. By way of example, a primary resource may be identified by the primary URL http://www.facebook.com/home.php while a target web page may be identified by appending a fragment identifier to the URL of the primary resource, such as http://www.facebook.com/home/php#/friends/?ref=tn. In other words, the target web page identified by the latter URL (and which includes the appended fragment identifier) may be considered a "child" web page and the web page corresponding to the former URL may be considered a "parent" web page. History managers in web browsers such as Mozilla Firefox and other like W3C compliant browsers are configured to record URLs of rendered web pages as well as fragment identifiers appended to the URLs. As will be described in more detail below, the event handlers serve to notify process 200 when the aforementioned events occur.

Figure 3A:
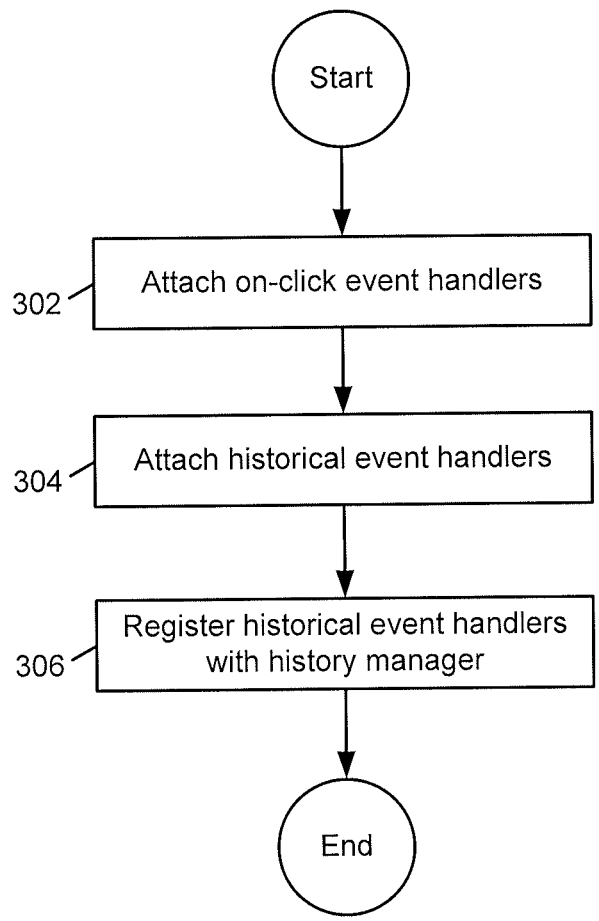
FIG. 3A illustrates an example process for initializing a page rendering process.
Figure 3B:
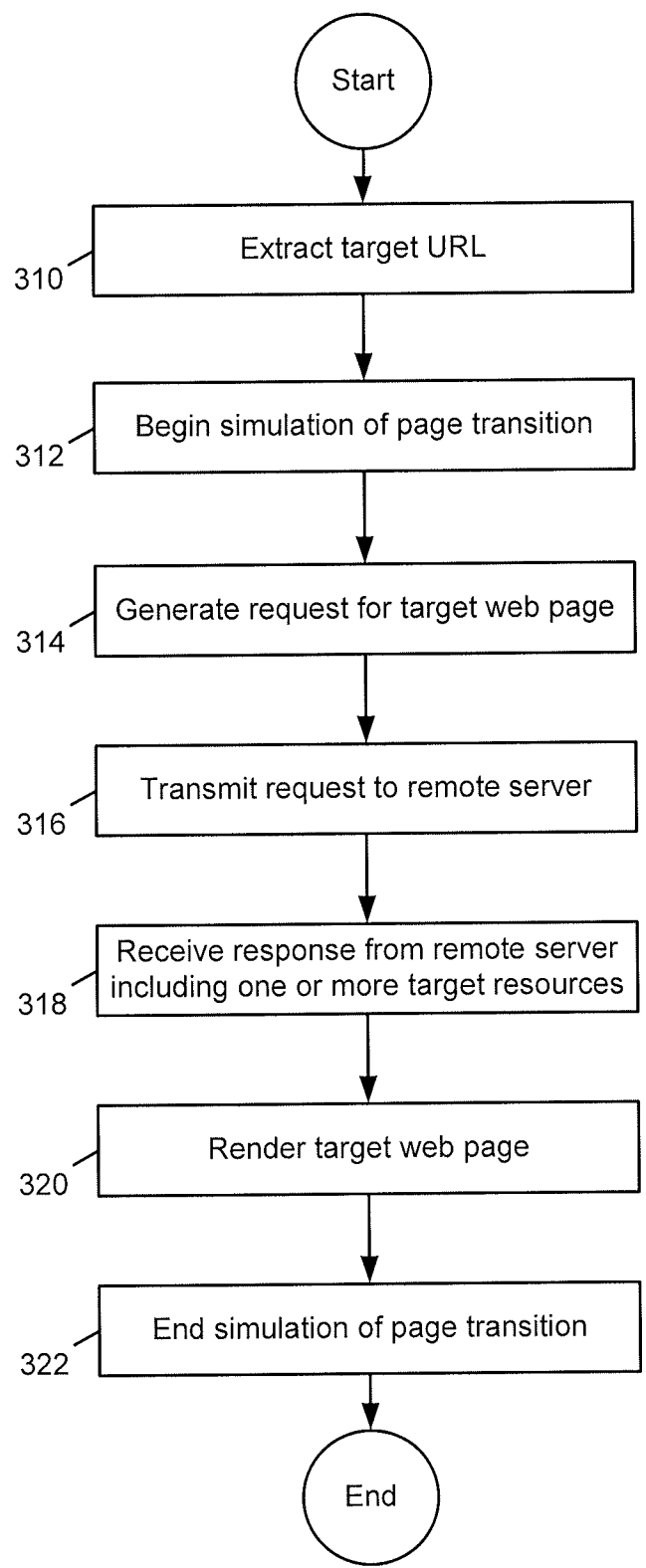
FIG. 3B illustrates an example process for rendering a target web page.

Now referring to the flowchart illustrated in FIG. 3B, when a user desires to navigate to a new or "target" web page from the currently rendered web page (e.g., by clicking on a textual link or a link embedded within a page element such as a picture or user profile icon within the currently rendered web page, by clicking the back or forward button, or by typing or otherwise entering the URL of the target web page), one of the aforementioned events is passed to a corresponding event handler which performs one or more operations in response to the event as discussed below. Conventionally, upon the occurrence of an event, browser 210 formulates a request for the target web page (i.e., all of the resources needed to render the target web page) and transmits the request to server 22. Thus, conventionally, each time a user requests to navigate to a target page, the browser would transmit a request to the server for the full target page, unload the currently rendered page, and render the target page received from the server in its entirety "from scratch;" that is, not using any of the resources previously downloaded to render one or more previously rendered web pages. Conventionally, this full page loading and unloading would hold true for each subsequent page the user requests. Hence, conventionally, even if the target web page and the currently rendered web page include or share a substantial amount of the same content or other resources, the browser would still send a request for the entire target web page including the redundant content or other resources previously transmitted for the currently rendered web page. However, in particular embodiments, and as described in more detail below, process 200 takes advantage of the shared content and other resources between web pages having the same primary URL as well as scripts already executed or executing to more efficiently request the needed resources for rendering the target web page.

In one example embodiment, upon receiving notification of an event via the corresponding event handler, page rendering process 200 effectively intercepts the request generated by browser 210 thereby preventing a conventional request from being transmitted to the server 22. As will be described in more detail below, this enables page rendering process 200 to formulate its own request for resources corresponding to the target page and eliminate the need for full page loading, thereby eliminating the transmitting of redundant data, certain page rendering operations (such as initializing one or more scripts) and improving network performance.

By way of example, assuming that the event is an on-click event corresponding to the clicking or selection of a link in the currently rendered web page, the event handler corresponding to the selected link notifies page rendering process 200 that the corresponding on-click event has occurred. However, in order to detect the selection of a back or forward button, history manager 220 periodically polls (e.g., every 200 milliseconds (ms)) a historical log of visited web pages to determine whether the most current URL recorded by history manager 220 matches the URL of the currently rendered web page. More specifically, in an example embodiment, history manager 220 transmits event notifications to notify page rendering process 200 of historical events by calling the corresponding historical event handlers registered by page rendering process 200. In other words, if a target web page is requested as described above, history manager 220 extracts the URL of the target web page. Assuming the target web page is a secondary or child web page and the currently rendered web page is either a primary or parent web page or another child web page, browser 210 still considers the target web page to effectively be the same page as the currently rendered web page given that they share the same primary URL; however, history manager 220 appends the fragment identifier corresponding to the target web page to the primary URL and records this as the most current URL in the browser history historical log. In this way, when history manager 220 polls the historical log after recording the fragment identifier associated with the target page, history manager 220 may compare the most current URL in the log with the URL corresponding to the currently rendered web page and, if the fragment identifiers are different (or if one of the two URLs does not include a fragment identifier), determine that the most current URL is different from the URL corresponding to the currently rendered web page thereby detecting that an event has occurred. History manager 220, via the corresponding historical event handler, then notifies page rendering process 200. Additionally, in particular embodiments, if the primary URL of the target web page is different from the primary URL of the currently rendered web page, page rendering process 200 does not intercept the request generated by browser 210, thus reverting to conventional default browser behavior and allowing browser 210 to request a full page load for the target web page.

After detecting that an event has occurred, page rendering process 200 then extracts the URL of the target web page (hereinafter referred to as the "target URL") at 310 as illustrated in FIG. 3B. By way of example, in this case of an on-click event corresponding to the selection of a link, page rendering process 200 may extract the target URL as well as other identifying information associated with the target web page from one or more link attributes embedded with the link. In the case of an event corresponding to the selection of a back or forward button, page rendering process 200 may extract the target URL and/or other identifying information from history manager 220.

In particular embodiments, page rendering process 200 may begin, at 312, a simulation of a typical page transition experience generally experienced when transitioning from one page to another (other alternate embodiments may not include a page transition simulation). By way of example, the page transition simulation may include "busy" indicators including one or more of the following: dynamically changing the shape, size, or position of the cursor such as, by way of example, generating a new cursor in the form of a rotating hourglass (implemented, for example, by changing or modifying the CSS properties for the body element of the web page); blanking out or whiting all or a portion of the client window (e.g., by setting the content areas of the page to empty or null values); rendering a "status" or "progress" bar in the client window (e.g., using iframe transport); and rendering a spinning or other dynamic icon next to the address bar rendered within the client window.

Page rendering process 200 then generates a request for the target web page at 314. By way of example, in order to generate the new request, page rendering process 200 may effectively translate a conventional request from browser 210 into one or more AJAX requests or calls. It should be noted, as described above, that AJAX refers generally to a variety of interrelated techniques used on the client side to asynchronously fetch content and, in some embodiments, may not necessarily involve JavaScripts or XML. However, in such embodiments, the new request may include one or more XMLHttpRequests for particular resources. In another particular embodiment, the new request may be implemented with a dynamically created invisible inline frame (iframe). More particularly, page rendering process 200 may assign or cause to be assigned the source attribute of the iframe to the target URL, causing a request identifying the target URL to be transmitted to server 22. The effect of this is that when browser 210 receives resources for the target web page in response to the new request, browser 210 will insert the resources in the response into the iframe. In particular embodiments, the iframe may call, for example, a JavaScript in the parent window that notifies page rendering process 200 of the arrival of the response. In still another alternate embodiment, page rendering process 200 may include a script tag in the new request. Page rendering process 200 then transmits the new request to server 22 at 316. Additionally, in some browser clients, page rendering process 200 creates an iframe to send the request that causes the browser status bar to display a busy or downloading status indicator, further simulating the page transition event.

In particular embodiments, server 22 also includes an abstraction layer 240 that is configured to determine whether an incoming request transmitted from client 30 is a request transmitted via page rendering process 200 or a conventional full page load request by browser 210. By way of example, abstraction layer 240 may be implemented as a Personal Home Page (PHP) script or PHP Hypertext Preprocessor (also PHP) script or file stored in or otherwise accessible by server 22. Furthermore, in some embodiments, page rendering process 200 may append or otherwise add a signature to the request transmitted via page rendering process 200. Such a signature enables abstraction layer 240 to readily identify the request as a request transmitted via process 200. Additionally, the request may also include another parameter or signature that indicates the particular version of page rendering page rendering process 200 executing within browser 210 so that abstraction layer 240 can better instruct server 22 as to how it should react or respond to the request. That is, assuming the request is a request from page rendering process 200, abstraction layer 240 can instruct server 22 to bypass or skip some of the operations required when responding to conventional full page requests.

In response to the request from page rendering process 200, server 22 retrieves, from data store 24 or other servers or databases, one or more resources required to render the target web page at client 30. By way of example, the response from server 22 may include a JSON encoded data structure that includes the required resources, HTML content, and initialization code or scripts. However, rather than transmit all of the resources required to render the target web page, server 22 only retrieves and transmits those resources not previously transmitted to browser 210 in the user session as browser 210 has already cached portions of the content and resources required to render the target web page as these portions were already received and utilized by browser 210 in rendering one or more previous web pages. Process 200 receives the response, including the new resources required to render the target web page, from server 22 at 318 and dynamically downloads the new resources. In particular embodiments, page rendering process 200 facilitates, again using AJAX or other asynchronous techniques, the rendering of the new resources in the context of the previously rendered web page at 320, and ends the page transition simulation at 322. That is, in particular embodiments, page rendering process 200 resets or recycles content and other resources from previously rendered web pages and re-renders these recycled resources based on the new resources received in the response from server 22. In particular embodiments, page rendering process 200 causes browser 210 to re-render the portions of the target web page that have been previously downloaded or cached and then inserts the new resources received in the response at 318 to complete the rendering of the target web page. Particular embodiments reduce or eliminate the processing overhead associated with re-transmitting, re-downloading, and re-initializing commonly required code modules and other resources, such as JavaScript or CSS scripts or files, that execute within the context of the target web page and that have previously been downloaded and initiated when rendering previously rendered web pages thereby reducing bandwidth requirements and reducing the time required to render the target web page. In various embodiments, page rendering process 200 then waits for a next event.

However, in particular embodiments, page rendering process 200 may be configured to allow browser 210 to request a full page load for a target web page regardless of the fragment identifier corresponding to the target web page after a predetermined number n of requests (e.g., 10, 20, or 30 requests). By way of example, page rendering process 200 may call or employ a counter to count the number of consecutive requests from page rendering process 200 after a full page load. This is intended at least in part to reconcile an implementation issue. More particularly, since a browser's cache memory is finite, and continuing to cache resources increases consumption of cache memory, page rendering process 200 may periodically flush the cache and request a full page load of a target web page so as to avoid filling the cache and hampering performance of the client.

The behavior of page rendering process 200 will now be described in the case that browser 210 is, for example, a version of Microsoft Windows Internet Explorer or the like. Unlike Mozilla Firefox, Microsoft Windows Internet Explorer does not record changes in fragment identifiers or hashes using history manager 220. In particular embodiments, page rendering process 200, and particularly the initialization function, may begin by inserting an inline frame (iframe) within a frame of the currently rendered web page. In particular embodiments, the inserted iframe is invisible to the user and includes a source property. When a target web page is selected, history manager 220 changes a source property or src attribute of the iframe to reflect the target web page. By way of example, the src attribute may be set to an index value which then maps to a particular URL stored in a table by history manager 220. Microsoft Windows Internet Explorer has the property that, if the source property of the iframe is changed, history manager 220 records a new entry in the browser history data store. By way of example, if a user then selected a back or forward button, browser 210 restores the previous value of the source property of the iframe corresponding to the desired web page.

In particular embodiments, a simple and static HTML page is embedded within the invisible inserted iframe. Information corresponding to the currently rendered web page is attached or appended to the query string corresponding to the HTML page. In particular embodiments, the embedded HTML page includes JavaScript that calls the parent page to notify page rendering process 200 when an event occurs. More particularly, the parent page may notify history manager 220 of the event and then history manager 220 may notify page rendering process 200 of the event. In particular embodiments, page rendering process 200 then proceeds as illustrated in FIG. 3B by extracting the target URL for the target web page at 310

Although the present disclosure describes and illustrates particular steps of the methods or processes of FIGS. 3A and 3B as occurring in a particular order, the present disclosure contemplates any suitable steps of the methods of FIGS. 3A and 3B occurring in any suitable order. Moreover, although the present disclosure describes and illustrates particular components carrying out particular steps of the methods of FIGS. 3A and 3B, the present disclosure contemplates any suitable combination of any suitable components carrying out any suitable steps of the methods of FIGS. 3A and 3B.

The applications and/or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 4:
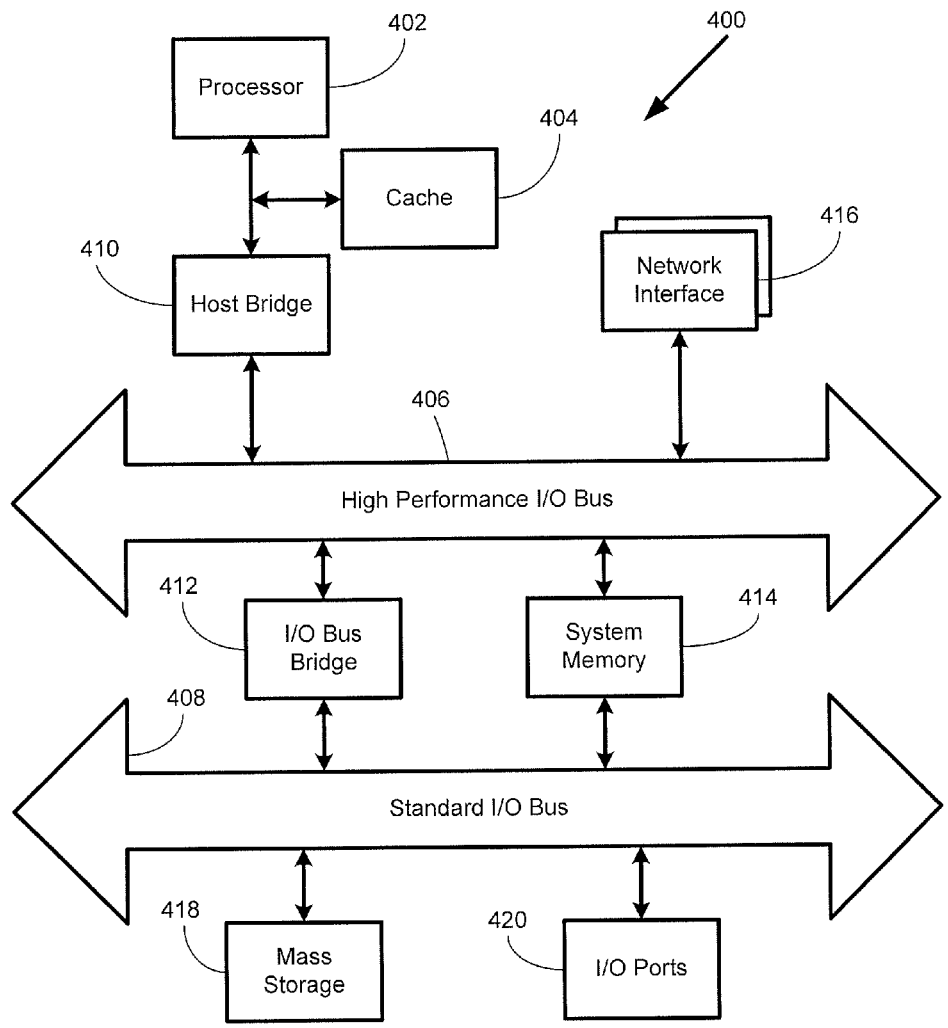
FIG. 4 illustrates an example computer system architecture.

FIG. 4 illustrates an example computing system architecture, which may be used to implement a server 22a, 22b. In one embodiment, hardware system 400 comprises a processor 402, a cache memory 404, and one or more executable modules and drivers, stored on a tangible computer readable medium, directed to the functions described herein. Additionally, hardware system 400 includes a high performance input/output (I/O) bus 406 and a standard I/O bus 408. A host bridge 410 couples processor 402 to high performance I/O bus 406, whereas I/O bus bridge 412 couples the two buses 406 and 408 to each other. A system memory 414 and one or more network/communication interfaces 416 couple to bus 406. Hardware system 400 may further include video memory (not shown) and a display device coupled to the video memory. Mass storage 418, and I/O ports 420 couple to bus 408. Hardware system 400 may optionally include a keyboard and pointing device, and a display device (not shown) coupled to bus 408. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 400 are described in greater detail below. In particular, network interface 416 provides communication between hardware system 400 and any of a wide range of networks, such as an Ethernet (e.g., IEEE 802.3) network, a backplane, etc. Mass storage 418 provides permanent storage for the data and programming instructions to perform the above-described functions implemented in the servers 22a, 22b, whereas system memory 414 (e.g., DRAM) provides temporary storage for the data and programming instructions when executed by processor 402. I/O ports 420 are one or more serial and/or parallel communication ports that provide communication between additional peripheral devices, which may be coupled to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain embodiments of the present invention may not require nor include all of the above components. For example, the peripheral devices shown coupled to standard I/O bus 408 may couple to high performance I/O bus 406. In addition, in some embodiments, only a single bus may exist, with the components of hardware system 400 being coupled to the single bus. Furthermore, hardware system 400 may include additional components, such as additional processors, storage devices, or memories.

In one implementation, the operations of the embodiments described herein are implemented as a series of executable modules run by hardware system 400, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 402. Initially, the series of instructions may be stored on a storage device, such as mass storage 418. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 416. The instructions are copied from the storage device, such as mass storage 418, into memory 414 and then accessed and executed by processor 402.

An operating system manages and controls the operation of hardware system 400, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

The invention claimed is:

1. A method comprising:
by a code segment executing on a client computing device and embedded in a first structured document rendered by the client computing device, detecting an event on the first structured document, the event directing the client application to generate a first request for a second structured document from a remote server;
by the code segment, intercepting the first request;
by the code segment, identifying one or more resources specified in the first request that are not currently stored on the client computing device;
by the code segment, generating a second request for resources to be sent to the remote server, wherein the second request specifies only one or more of the resources specified in the first request that are not currently stored on the client computing device;
sending the second request to the remote server;
receiving, in response to the second request, one or more of the resources specified in the second request; and
rendering the second structured document with:
one or more of the resources specified in the first request that are currently stored on the client computing device; and
one or more of the resources received in response to the second request.

2. The method of claim 1, further comprising simulating a page transition from the first structured document to the second structured document in a client window of the client application.

3. The method of claim 2, wherein simulating the page transition comprises one or more of:
causing the client application to generate or modify a cursor in the client window to indicate a transition;
causing the client application to generate or modify an icon in the client window to indicate a transition;
causing the client application to generate or update a status bar in the client window to indicate a transition; or
causing the client application to generate a blank screen in the client window.

4. The method of claim 1, further comprising extracting a Uniform Resource Locator (URL) for the second structured document.

5. The method of claim 4, wherein:
when the event comprises selection of a link rendered or embedded within the first structured document, extracting the URL for the second structured document comprises:
examining one or more link attributes associated with the link; and
extracting the URL from one or more of the link attributes; and
when the event comprises input causing forward or backward navigation from the first structured document, extracting the target URL comprises:
examining a data store of a history manager executing in connection with the client application; and
extracting the URL from the data store.

6. The method of claim 5, wherein the second request comprises the URL for the second structured document.

7. The method of claim 1, wherein the second request comprises an asynchronous request that comprises an XMLHttpRequest (XHR) or JSON request.

8. The method of claim 1, wherein the second request comprises an iframe request.

9. The method of claim 1, wherein one or more of the resources specified in the first request that are currently stored on the client computing device comprise cached content shared between the first and second structured documents.

10. The method of claim 1, further comprising forcing a full load of the second structured document after every n intercepted requests, wherein n is a predetermined integer.

11. The method of claim 1, further comprising:
by the code segment, attaching one or more first handlers to one or more links within the first structured document;
by the code segment, attaching second handlers to back and forward buttons of a client window that the first structured document is rendered in; and
registering the second handlers with a history manager executing in connection with the client application;
wherein intercepting by the code segment the first request comprises informing the code segment by a corresponding handler of the event.

12. The method of claim 1, further comprising, by the code segment, inserting an iframe in a frame of the first structured document.

13. The method of claim 12, wherein the iframe comprises an HTML page having a query string with identifying information corresponding to the second structured document comprising a source attribute that a Uniform Resource Locator (URL).

14. The method of claim 1, wherein the first request is intercepted before it is executed and sent to the remote server.

15. One or more computer-readable non-transitory storage media embodying software that is operable when executed to:
by a code segment executing on a client computing device and embedded in a first structured document rendered by the client computing device, detect an event on the first structured document, the event directing the client application to generate a first request for a second structured document from a remote server;
by the code segment, intercept the first request;
by the code segment, identify one or more resources specified in the first request that are not currently stored on the client computing device;
by the code segment, generate a second request for resources to be sent to the remote server, wherein the second request specifies only one or more of the resources specified in the first request that are not currently stored on the client computing device;
send the second request to the remote server;
receive, in response to the second request, one or more of the resources specified in the second request; and
render the second structured document with:
one or more of the resources specified in the first request that are currently stored on the client computing device; and
one or more of the resources received in response to the second request.

16. The media of claim 15, wherein the software is further operable when executed to simulate a page transition from the first structured document to the second structured document in a client window of the client application.

17. The media of claim 15, wherein the software is further operable when executed to extract a Uniform Resource Locator (URL) for the second structured document.

18. The media of claim 17, wherein:
when the event comprises selection of a link rendered or embedded within the first structured document, extracting the URL for the second structured document comprises:
examining one or more link attributes associated with the link; and
extracting the target URL from the one or more link attributes; and
when the event comprises input causing forward or backward navigation from the first structured document, extracting the URL for the second structured document comprises:
examining a data store of a history manager executing in connection with the client application; and
extracting the URL from the data store.

19. The media of claim 15, wherein the second request comprises an asynchronous request that comprises an XMLHttpRequest (XHR), iframe request, or JSON request.

20. The media of claim 15, wherein one or more of the resources specified in the first request that are currently stored on the client computing device comprise cached content shared between the first and second structured documents.

21. The media of claim 15, wherein the software is further operable when executed to force a full load of the second structured document after every n intercepted requests, wherein n is a predetermined integer.

22. The media of claim 15, wherein the software is further operable when executed to:
by the code segment, attach one or more first handlers to one or more links within the first structured document;
by the code segment, attach second handlers to the back and forward buttons of a client window that the first structured document is rendered in; and
register the second handlers with a history manager executing in connection with the client application.

23. The media of claim 15, wherein the first request is intercepted before it is executed and sent to the remote server.

24. An apparatus comprising:
one or more processors; and
a memory coupled to the processors comprising instructions executable by the processors, the processors being operable when executing the instructions to:
by a code segment executing on a client computing device and embedded in a first structured document rendered by the client computing device, detect an event on the first structured document, the event directing the client application to generate a first request for a second structured document from a remote server;
by the code segment, intercept the first request;
by the code segment, identify one or more resources specified in the first request that are not currently stored on the client computing device;
by the code segment, generate a second request for resources to be sent to the remote server, wherein the second request specifies only one or more of the resources specified in the first request that are not currently stored on the client computing device;
send the second request to the remote server;
receive, in response to the second request, one or more of the resources specified in the second request; and
render the second structured document with:
one or more of the resources specified in the first request that are currently stored on the client computing device; and
one or more of the resources received in response to the second request.

25. The apparatus of claim 24, wherein the second request comprises an asynchronous request that comprises an XMLHttpRequest (XHR), iframe request, or JSON request.

26. The apparatus of claim 24, wherein one or more of the resources specified in the first request that are currently stored on the client computing device comprise cached content shared between the first and second structured documents.

* * * * *